E. S. SAVAGE.
VEGETABLE MASHER.
APPLICATION FILED AUG. 23, 1909.

990,393.

Patented Apr. 25, 1911.

WITNESSES
D. Gurnee
L. Thon

INVENTOR
Edward S. Savage
BY
Osgood & Davis
his ATTORNEYS

UNITED STATES PATENT OFFICE.

EDWARD S. SAVAGE, OF ROCHESTER, NEW YORK.

VEGETABLE-MASHER.

990,393. Specification of Letters Patent. Patented Apr. 25, 1911.

Application filed August 23, 1909. Serial No. 514,274.

*To all whom it may concern:*

Be it known that I, EDWARD S. SAVAGE, a citizen of the United States, and resident of Rochester, in the county of Monroe and State of New York, have invented certain new and useful Improvements in Vegetable-Mashers, of which the following is a specification.

My invention relates to vegetable mashers of the form in which a plunger is mounted to slide within an open-ended perforated receptacle, the receptacle being adapted to receive a vegetable through its open end, and to confine such vegetable against the bottom of a suitable vessel while the plunger expels the substance of the vegetable through the perforations in the receptacle.

One object of my invention is to improve devices of the kind referred to by so mounting the plunger within the receptacle that it may be withdrawn from the upper end of the receptacle to facilitate the cleaning of the receptacle and the plunger, and to this end I so form the guide by which the plunger is supported in the receptacle that the plunger may be withdrawn as described without disconnecting it from the receptacle.

Another object of the invention is to produce a vegetable masher of the kind referred to which may be conveniently used when desirable in the manner of an ordinary solid vegetable masher, and to this end I provide means for retaining the plunger in a position in which it closes and preferably projects from the open end of the receptacle.

Figure 1:
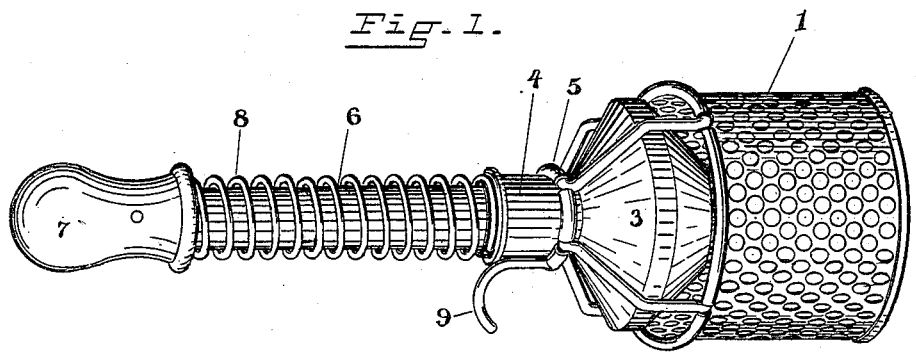

In the drawings: Figure 1 is a perspective view of a vegetable masher embodying the present invention; and Fig. 2 is a longitudinal section of the same showing parts of the plunger in full.

The illustrated embodiment of my invention comprises a cylindrical receptacle 1 open at both ends and provided throughout with perforations 2. The plunger is provided with a head 3 of nearly the full internal diameter of the receptacle, and this head is mounted upon a stem 6 provided at its upper end with an operating handle 7. The plunger is guided within and connected with the receptacle by means of a bearing sleeve 4 which surrounds the stem 6, and this sleeve is connected with the receptacle by a plurality of arms 5 constituting a spider-like frame for supporting the bearing sleeve. The face 3ª of the plunger is of conical form to assist the operation of forcing the vegetable material laterally through the perforations in the body 1.

Figure 2:
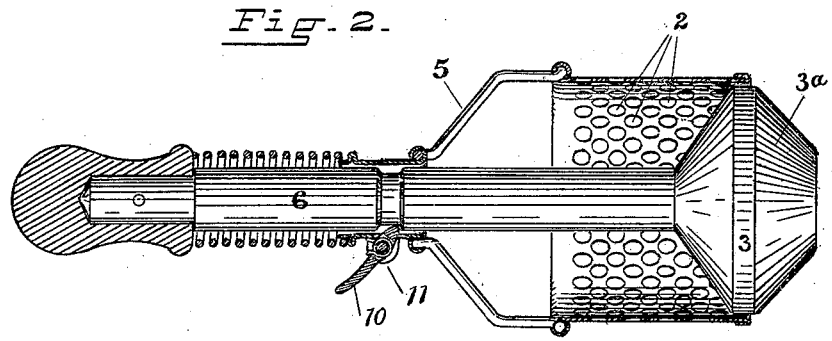

In order that the head of the plunger may be withdrawn completely from the receptacle for convenience in cleaning the device, the arms 5 are so formed, as shown particularly in Figs. 1 and 2, that for a short distance beyond the upper end of the receptacle they are spaced apart the full diameter of the receptacle, and thus the head of the plunger may be drawn into the space between these arms, as shown in Fig. 1, and in this position the entire inner surface of the receptacle and the entire head of the plunger are accessible for the purpose of cleaning these parts.

A coiled compression spring 8 surrounding the stem 6 and bearing at its ends against the handle 7 and the sleeve 4, respectively, operates normally to retract the plunger to the position of Fig. 1 and to keep the receptacle 1 pressed against the bottom of the vessel in connection with which the device is used. When it is desired to use the device in the manner of an ordinary solid vegetable masher, it is necessary to hold the plunger in the position in which it closes the open end in the receptacle 1, as shown in Fig. 2, against the action of the spring 8. In Fig. 1 I have shown one means for accomplishing this, in the form of a hook 9 which may be held by the finger of the user of the device. As a preferable means for this purpose, however, as shown in Fig. 2, a spring-pressed latch 10 is provided which is pivoted on ears 11 on the sleeve 4 in position to engage an annular groove in the stem of the plunger when the plunger is in the required position. During the normal operation of the device the downward movement of the plunger is limited to the contact of its extremity with the bottom of the vessel, and in this manner the groove is prevented from advancing sufficiently to engage the latch, so that the latch does not interfere with the ordinary operation of the device.

With the parts in the position of Fig. 2 the masher may be used to perform the preliminary operation of breaking up the potatoes, or other vegetables to be operated upon, and the latch may then be released and the substance of the vegetables forced out through the perforations in the receptacle, thus completing the mashing operation.

What I claim is—

1. A vegetable masher having, in combination, a transversely perforated open-ended receptacle, a plunger arranged to reciprocate in the receptacle and having a head and a shank, a bearing through which the shank of the plunger slides, and arms connecting said bearing with the receptacle, the arms being spaced farther apart, above the upper end of the receptacle, than the width of the head of the plunger, and having a length greater than the thickness of the head, so as to permit the head to be retracted above and clear of said upper end.

2. A vegetable masher having, in combination, a transversely perforated open-ended receptacle, a plunger arranged to reciprocate in the receptacle, and means for retaining the plunger in a position to close the open lower end of the receptacle.

3. A vegetable masher having, in combination, a transversely perforated open-ended receptacle, a plunger arranged to reciprocate in the receptacle, a spring connected with the plunger for raising it, and means for retaining the plunger in a position to close the open lower end of the receptacle.

EDWARD S. SAVAGE.

Witnesses:
D. GURNEE,
L. THON.

Copies of this patent may be obtained for five cents each, by addressing the "Commissioner of Patents, Washington, D. C."